106-99 AU 113 EX
7/3/79 OR 4,159,911

United States Patent [19]
Takazuka

[11] 4,159,911
[45] Jul. 3, 1979

[54] METHOD OF MIXING STEEL FIBER REINFORCED CONCRETE

[75] Inventor: Takeshi Takazuka, Yokohama, Japan

[73] Assignee: Nippon Kokan Kabushiki Kaisha, Tokyo, Japan

[21] Appl. No.: 880,498

[22] Filed: Feb. 23, 1978

[30] Foreign Application Priority Data

Feb. 28, 1977 [JP] Japan ........ 52-20109

[51] Int. Cl.[2] ........ C04B 7/02; C04B 31/04
[52] U.S. Cl. ........ 106/99; 264/24
[58] Field of Search ........ 106/99; 264/24

[56] References Cited

U.S. PATENT DOCUMENTS 4,062,913 12/1977 Miller ........ 106/99

*Primary Examiner*—James Poer
*Attorney, Agent, or Firm*—Haseltine, Lake & Waters

[57] ABSTRACT

A method of mixing a steel fiber reinforced concrete comprising the steps of subjecting steel fibers each having a surface to weight ratio of over 900 $mm^2/g$ to a pretreatment so as to orientate said steel fibers in a predetermined direction, randomly directing said orientated steel fibers through grating means having a grating space which is about two to four times the length of each of said steel fibers, and thereby introducing said steel fibers into components of a concrete or into an uncured concrete made up of the same.

6 Claims, 4 Drawing Figures

METHOD OF MIXING STEEL FIBER REINFORCED CONCRETE

BACKGROUND OF THE INVENTION

The present invention relates to a method of mixing steel fiber reinforced concrete, and more particularly the invention relates to a method of introducing steel fibers into components of concrete or into an uncured concrete made up of these components.

The most important matter that must be considered in mixing the components of steel fiber reinforced concrete is how to uniformly distribute steel fibers into steel fiber reinforced concrete. This becomes increasingly important in case the amount of steel fibers is increased so as to increase the concrete strength. In the mixing of steel fiber reinforced concrete, the steel fibers tend to interlock with one another and conglomerate to form into balls. Such ball-shaped conglomerates will be made up of steel fibers only, steel fibers and paste, steel fibers and aggregates, steel fibers and mortar, etc., and it is difficult to break up such conglomerates into pieces once the conglomerates have been formed. The formation of such ball-shaped conglomerates will reduce the strength of steel fiber reinforced concrete considerably. As a result, to eliminate the formation of such conglomerates is the most important requirement which must be met during the mixing of steel fiber reinforced concrete.

Generally, steel fibers are packed and transported in box containers, e.g., corrugated boxes, and consequently the steel fibers interlock with one another thus gathering into conglomerate-like masses by the time that the steel fibers arrive at the job site where they are used. To uniformly scatter and distribute steel fibers, they are charged into a mixer after manually unraveling when the amount of steel fibers used is small, and where a large amount of steel fibers are used they are charged into a mixer after they have been placed in a machine, such as a dispenser or vibrating screen. While this has the effect of practically preventing the formation of conglomerates during mixing, from the standpoint of mass production and product quality there is a disadvantage that the manual as well as mechanical unraveling operation requires a long period of time. To overcome this difficulty, it is necessary to provide an unpacking and unraveling equipment of a sufficient capacity corresponding to the capacity of a concrete mixing plant. For example, in the case of a batcher plant including a forced agitation mixer of 3000 Lit. capacity, it is necessary to use about 3 dispensers each having a capacity of 60 Kg/min, and the manpower for unpacking and charging purposes must meet the requirements of the three dispensers.

SUMMARY OF THE INVENTION

It is therefore the object of the present invention to provide a mixing method which is capable of efficiently introducing steel fibers into the components of concrete or into an uncured concrete made up of these components, eliminating the formation of conglomerates during mixing and uniformly and randomly distributing the steel fibers within the concrete.

In accordance with the present invention, there is thus provided a method of mixing steel fiber reinforced concrete comprising the steps of subjecting steel fibers each having a surface to weight ratio of over 900 $mm^2/g$ to a pretreatment so as to orientate said steel fibers in a predetermined direction, randomly directing said orientated steel fibers through grating means having a grating space which is about two to four times the length of each of said steel fibers, and thereby introducing said steel fibers into components of a concrete or into an uncured concrete made up of the same.

In accordance with a preferred embodiment of the method according to the invention, there is provided a mixing method wherein each of said steel fibers has a carbon content of 0.1% or less, and wherein said pretreatment consists in introducing steel fibers discharged from a steel fiber production machine into a container made from a nonmagnetic material and placed in a magnetic field and orientating said introduced steel fibers by a magnetic force to provide an apparent specific gravity of over 1.9.

In accordance with a further preferred embodiment of the method of this invention, there is provided a mixing method wherein the intensity of said magnetic force is over 800 gauss, and wherein said magnetic field is repeatedly turned off and on while said steel fibers are being charged into said container.

In accordance with another embodiment of the method of this invention, there is provided a mixing method wherein said pretreatment is such that steel fibers discharged from a steel fiber production machine are introduced into a container through a hopper having a plurality of vertical partitions arranged at a spacing smaller than the length of each of said steel fibers to thereby orientate said steel fibers with an apparent specific gravity of over 1.08.

DETAILED DESCRIPTION OF THE INVENTION

Figure 1:
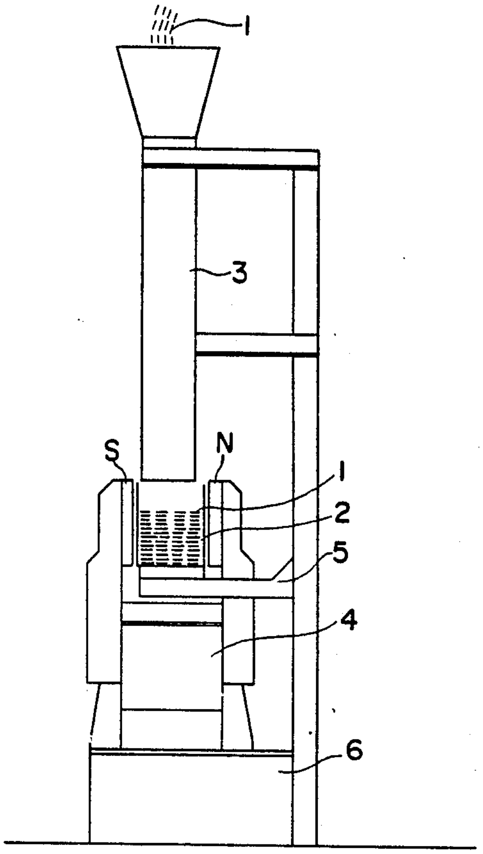
FIGS. 1 and 2 are respectively a front view and a side view of an embodiment of an apparatus for performing the pretreating step of the mixing method according to the invention.

The steel fibers used with the present invention are of the type having a surface to weight ratio of as high as 900 $mm^2/g$ so as to ensure increased reinforcing efficiency. The following are some examples of the steel fibers.

| Dimension (mm) | Weight (g) | Surface area ($mm^2$) | Surface area / Weight (mm/g) |
|---|---|---|---|
| 0.2 × 0.3 × 30 | 0.0212 | 36 | 1698 |
| 0.25 × 0.55 × 25 | 0.0270 | 40 | 1481 |
| 0.5 × 0.5 × 30 | 0.0589 | 60 | 1091 |

A large surface to weight ratio of steel fibers gives rise to such phenomena as making it difficult to ensure the required tight packing, causing the tendency to interlock in the case of long steel fibers and so on, and it also gives rise to many difficulties in the course of manufacturing and mixing steel fibers with the components of concrete or into an uncured concrete made up of such components.

A feature of the invention resides in that such steel fibers can be smoothly and efficiently mixed into the concrete.

With the method of this invention, the steel fibers may be pretreated to orientate the same in a desired direction. The ordinary steel fibers not subjected to such pretreatment have apparent specific gravities of less than about 0.7.

In accordance with an embodiment of the pretreatment, the steel fibers falling from a steel fiber production machine are received in a nonmagnetic container placed in a magnetic field and the steel fibers are orientated by the magnetic force, thus increasing the apparent specific gravity to over 1.9. This pretreating process will now be described with reference to the embodiment shown in FIGS. 1 and 2.

Steel fibers 1 are discharged into a hopper 3 directly or by way of a conveyor or the like from a steel fiber production machine which is not shown. Disposed below the hopper 3 is a nonmagnetic container 2 made from cardboard, plastic or the like. Also disposed oppositely on the opposite sides of the container 2 are the magnetic poles N and S of a bipolar electromagnet 4 and the magnetic poles are substantially the same in area with the container sides. The magnetic poles N and S produce the substantially parallel magnetic flux horizontally within the container 2. Thus, the steel fibers 1 falling into the container 2 through the hopper 3 are orientated by the magnetic force. Since the steel fibers 1 have a large surface to weight ratio, their falling speed will be decreased due to the air resistance as compared with a packing of nails or the like. As a result, the continued production of magnetic flux makes it difficult to pack the steel fibers 1 tight together in the container 2, and it is desirable to turn the magnetic field off and on repeatedly. In this way, the steel fibers 1 are packed in the container 2 with an apparent specific gravity of over 1.9. The experiments conducted by the inventors have shown that the magnetic field intensity must be over 800 gauss in order to ensure the desired orientation of steel fibers. Also, in order that the pretreating operation may be performed effectively, it is necessary that the steel fibers be made from soft magnetic steel having a carbon content of less than 0.1% so as to allow practically no residual magnetism in the steel fibers when they are removed from the magnetic field.

Figure 2:
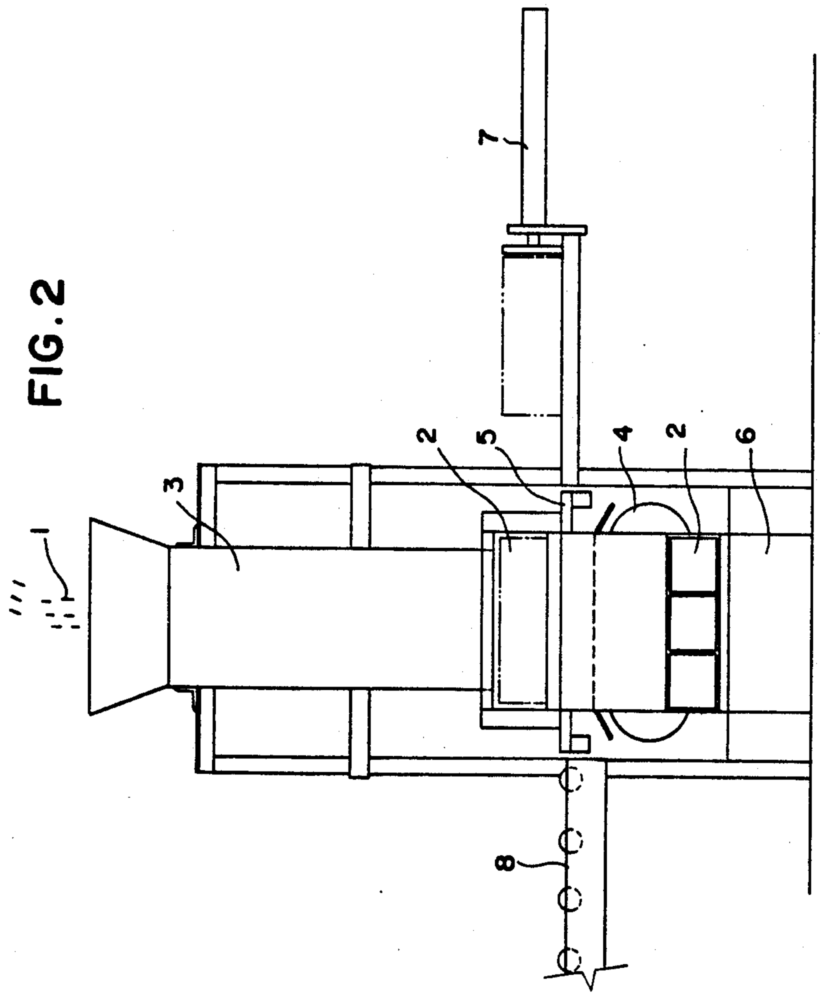

In FIGS. 1 and 2, numeral 5 designates an elevator for lifting the container 2 from a pedestal support 6 to packing level. Numeral 7 designates a pusher whereby the container 2 lifted by the elevator 5 is moved into a packing position and the packed container 2 is then moved onto a conveyor 8.

Figure 3:
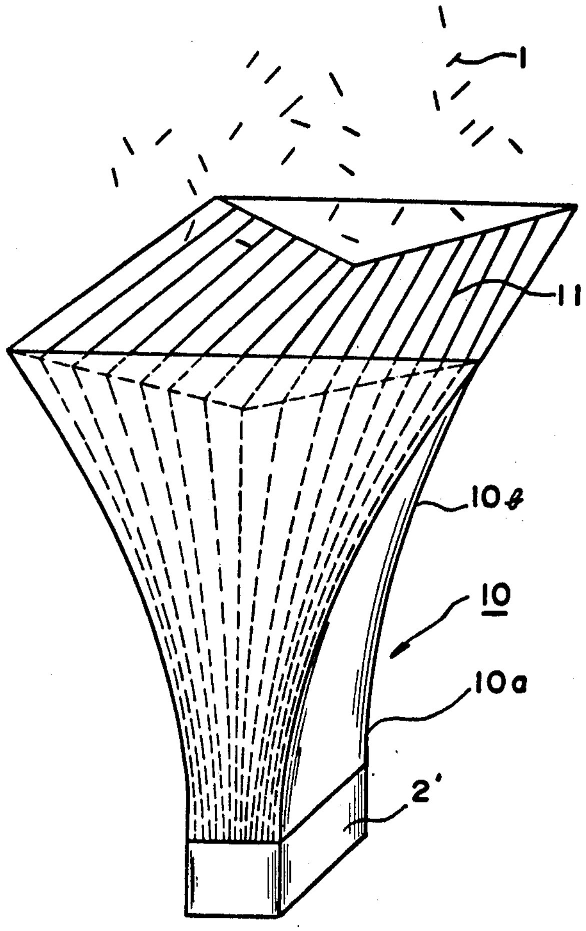
FIG. 3 is a perspective view of another embodiment of the apparatus for performing the pretreating step of the method according to the invention.

In accordance with another embodiment of the pretreating operation in the method of this invention, the apparatus shown in FIG. 3 is used.

In the Figure, numeral 10 designates a hopper used for this pretreating operation. Steel fibers 1 are fed into the hopper 10 from the above directly or by way of a conveyor or the like from a steel fiber production machine. The hopper 10 comprises a square cylindrical body 10*a* corresponding in length and width to a container 2′ and a flared portion 10*b* joined on the body 10*a* and gradually spread out upwardly. The hopper body 10*a* is provided with a large number of vertical partitions 11 which are arranged at a spacing narrower than the length of the steel fiber 1, and the vertical partitions 11 extend to the flared portion 10*b* in such a manner that their spacing is increased as the flared portion 10*b* spreads out upwardly. Thus, the steel fibers 1 are orientated by the vertical partitions 11 while they are falling down within the hopper 10, and the steel fibers 1 are received in the container 2′ disposed below the hopper 10 with an apparent specific gravity of over 1.08.

The steel fibers used with the method of this invention have a surface to weight ratio of over 900 $mm^2/g$ (this is on the order of several tens $mm^2/g$ in the case of the ordinary nail and the like) with the resulting decrease in falling speed, and consequently while the steel fibers discharged from the production machine fall randomly, there is no danger of the steel fibers interlocking with one another and the steel fibers can be ingeniously orientated by the partitioned hopper of this invention.

Figure 4:
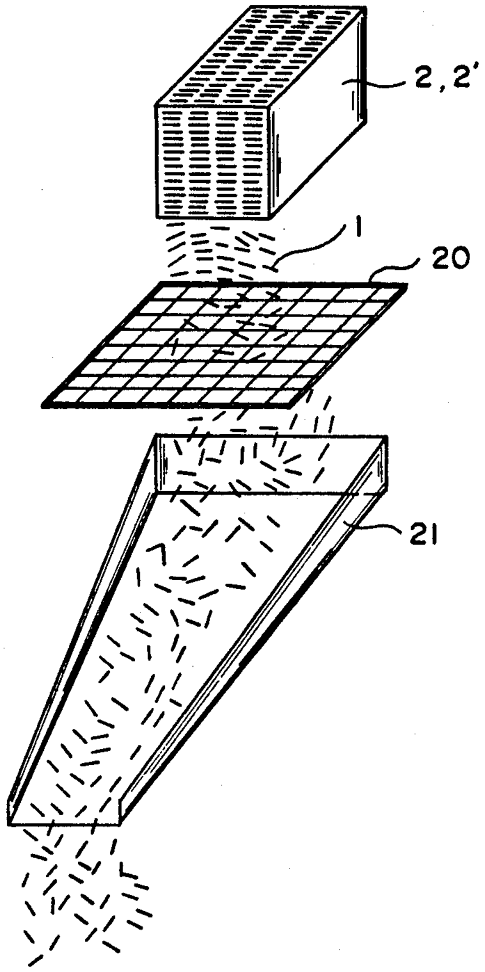
FIG. 4 is a schematic perspective view of an apparatus designed to perform the step of the method according to the invention for charging orientated steel fibers into the components of concrete or an uncured concrete made up of such components.

In accordance with the method of this invention, the thusly orientated steel fibers are randomly directed through a grate member with a grating space which is about 2 to 4 times the length of the steel fiber and are then introduced into the components of concrete or into an uncured concrete made up of such material. This operation will now be described with reference to the schematic diagram of FIG. 4.

In the Figure, the steel fibers 1 orientated within the container 2 (or 2′) with an apparent specific gravity of over 1.9 or 1.08 are fed onto a grate member 20 from which the steel fibers 1 are charged into a concrete mixer (not shown) directly or by way of a trough 21. Where the spacing of the wires or rods of the grate member is less than two times the length of the steel fiber, although the spacing is greater than the length of the steel fiber, the steel fibers will tend to bridge over the wires or rods thus impeding the falling of the steel fibers through the grate member 20, and consequently it will be necessary to vibrate the grate member 20 or use any suitable means. On the other hand, if the spacing of the wires or rods of the grate member is greater than about 4 times the length of the steel fiber, the orientated steel fibers will be caused to fall in lumps with the result that nonuniform distribution of the steel fibers will be caused particularly in the case of the mixer operated at a low rotational speed. Thus, the steel fibers 1 are randomly directed while passing through the grate member 20 and in this manner the steel fibers 1 fall onto the trough 21 from which they are fed into the concrete mixer.

Thus, with the arrangement described above, the method of this invention is capable of introducing steel fibers into the components of concrete or into an uncured concrete made up of such components with ease but without requiring the use of any large capacity dispenser and much labor and without any danger of forming conglomerates during the mixing as in contrast to the known mixing methods.

Although it has been recognized that the most important requirement for attaining the desired reinforcement is to randomly mix steel fibers into the concrete with a uniform spacing, the method of this invention includes a pretreatment step of orientating steel fibers in one direction prior to their charging into the mixer, and this concept is not precedented by the prior art.

DESCRIPTION OF THE PREFERRED EMBODIMENTS

EXAMPLE 1

| | | |
|---|---|---|
| (1) | The steel fibers used | |
| | Dimension | 0.5 × 0.5 × 30 mm |
| | Surface area / weight: | 1019 $mm^2/g$ |
| | Carbon content: | 0.05% |
| (2) | Pretreating operation | |
| | Orientation: | Effected by magnetic force |
| | Container: | Corrugated box 40 cm long, 17 cm wide and 15 cm high with 10.2 Lit. holding capacity |
| | Production of magnetic field: | Effected by a bipolar electromagnet having its magnetic poles oppositely disposed on the widthwise sides of the container |
| | Working voltage: | 180 V |
| | Working current: | 3.5 Amp |
| | Field intensity: | 850 gauss |
| | On-off operation of magnetic field: | On and off times of 30 and 10 seconds, respectively, were repeated |
| | Filling time per container: | 120 seconds |
| | Loaded weight: | 20 Kg |
| | Apparent specific gravity of filled steel fibers: | 1.96 (20 Kg/10.2 Lit.) |

(3) Charging operating

The containers having the thusly orientated steel fibers packed therein were conveyed and unpacked by two operators so that the steel fibers were dropped onto the grate member, directed onto the trough and then charged into the mixer.

| | |
|---|---|
| Grate member: | Grating space, 10 cm; wire diameter, 6 mm |
| Mixer used: | Double-blade forced agitation type |
| Charge: | 100 kg/concrete $m^3$ |
| Charging time: | 50 sec per 100 Kg of steel fiber |

After the steel fibers had been charged, the mixing was continued for another 50 seconds. Samples of 1 Lit. each were taken randomly from the mixed concrete, washed with water and then only the steel fibers were picked up with a magnet for measurement. The study of the distribution of the steel fibers showed that the deviations from the desired value of 100 $Kg/m^2$ were on the order of 6% and it was confirmed that the steel fibers were distributed uniformly.

In accordance with the method of this invention, 100 Kg of steel fibers can be charged in 50 seconds, and this represents a remarkable improvement in charging efficiency as compared with the prior art methods requiring 90 seconds for charging. With the prior art methods, it is necessary to use a large capacity dispenser, and moreover where the batcher plant has a large mixing capacity, it is necessary to charge a large amount of steel fibers within a short mixing time, thus making it necessary to increase the number of dispensers and also increase the number of operators correspondingly. For instance, to mix 100 $Kg/m^3$ of steel fibers into the concrete of 3 $m^3$ within 90 seconds, it is necessary to employ three dispensers each having a dispensing capacity of 60 Kg/min and the number of operators must be 6. In accordance with the method of this invention, not only the use of any dispenser is eliminated, but also the required increase in the number of operators is small. In addition, the weight of the dispenser is in the range of 100 to 200 Kg, and it is very hard job to arrange such dispenser on the working floor of a batcher plant which is over 10 m above the ground. In the case of the method according to the invention, it is only necessary to arange a simple grate member.

EXAMPLE 2

(1) Steel fiber used

The same type of steel fibers as used in Example 1

| | | |
|---|---|---|
| (2) | Pretreating operation | |
| | Orientation: | Effected by a hopper with vertical partitions |
| | Hopper: | Number of vertical partitions 18; spacing, 1 cm in body portion, 3.5 cm in flared portion; flared top, 60 × 60 cm |
| | Container: | The same as in Example 1 |
| | Apparent specific gravity of steel fiber in container: | 1.08 (11Kg/10.2 Lit.) |

(3) Charging operation

The same as in Example 1 except that the charging time was 80 seconds per 100 Kg of steel fibers.

In accordance with this example, while, due to the low apparent specific gravity of the packed steel fibers as compared with that of Example 1, the charging efficiency is lower than Example 1 and closer to the efficiency of the prior art methods, the method of Example 2 still has the advantage of the method of this invention, that is, the elimination of the use of dispensers.

I claim:

1. A method of mixing steel fibers having a surface to weight ratio of over 900 $mm^2/g$ into a concrete mix comprising the steps of orientating said steel fibers in a predetermined direction and randomly directing said orientated steel fibers into said concrete mix through grating means having a grating space which is about 2 to 4 times the length of each of said steel fibers.

2. The method of claim 1 wherein each of said steel fibers has a maximum carbon content of 0.1% and said steel fibers are orientated by charging said steel fibers into a nonmagnetic container in a magnetic field and subjecting said steel fibers to a magnetic force sufficient to produce an apparent specific gravity of over 1.9 in the orientated steel fibers.

3. The method of claim 2 wherein the intensity of magnetic force is over 800 gauss and wherein said magnetic field is repeatedly turned off and on while charging said steel fibers into said container.

4. The method of claim 1 wherein said steel fibers are orientated by passing said steel fibers through a hopper having a plurality of vertical partitions arranged with a spacing smaller than the length of each steel fiber so as to produce an apparent specific gravity of over 1.08 in the orientated steel fibers.

5. The method of claim 3 wherein the dimension of each steel fiber is 0.5 × 0.5 × 30 mm, the intensity of the magnetic force is 850 gauss, the magnetic field is repeatedly turned on for 30 seconds and off for 10 seconds and the grating space is 10 cm using wire with a diameter of 6 mm.

6. The method of claim 4 wherein the dimension of each steel fiber is 0.5 × 0.5 × 30 mm, the hopper has 18 vertical partitions with a spacing of 1 cm in the body portion and 3.5 cm in the flared portion, and the grating space is 10 cm using wire with a diameter of 6 mm.

* * * * *